(12) United States Patent
Carr

(10) Patent No.: US 7,739,460 B1
(45) Date of Patent: Jun. 15, 2010

(54) INTEGRATED CIRCUIT MEMORY SYSTEMS HAVING WRITE-BACK BUFFERS THEREIN THAT SUPPORT READ-WRITE-MODIFY (RWM) OPERATIONS WITHIN HIGH CAPACITY MEMORY DEVICES

(75) Inventor: David Walter Carr, Ontario (CA)

(73) Assignee: Integrated Device Technology, Inc., San Jose, CA (US)

( * ) Notice: Subject to any disclaimer, the term of this patent is extended or adjusted under 35 U.S.C. 154(b) by 429 days.

(21) Appl. No.: 11/861,399

(22) Filed: Sep. 26, 2007

Related U.S. Application Data

(63) Continuation-in-part of application No. 10/929,875, filed on Aug. 30, 2004, now abandoned.

(51) Int. Cl.
*G06F 12/00* (2006.01)
(52) U.S. Cl. ........................ 711/155; 711/105
(58) Field of Classification Search ........................ None
See application file for complete search history.

(56) References Cited

U.S. PATENT DOCUMENTS

| | | | |
|---|---|---|---|
| 4,489,381 A | 12/1984 | Lavellee et al. | |
| 5,909,334 A | 6/1999 | Barr et al. | |
| 6,460,010 B1 | 10/2002 | Hanes et al. | |

OTHER PUBLICATIONS

Shah et al., "Analysis of a Statistics Counter Architecture," http://tiny-tera.Stanford.edu/~nickm/papers/hoti2001.pdf, undated.
Ramabhadran et al., "Efficient Implementation of a Statistics Counter Architecture," SIGMETRICS'03, Jun. 10-14, 2003, San Diego, CA, http://www-cse.ucsd.edu/~varghese/PAPERS/srirampaper.pdf.

*Primary Examiner*—Kevin Verbrugge
(74) *Attorney, Agent, or Firm*—Myers Bigel, et al.

(57) ABSTRACT

An integrated circuit memory system includes a write-back buffer and a control circuit that support read-write-modify (RWM) operations within a high capacity memory device. A RWM operation may include reading from the integrated circuit memory device and the write-back buffer to identify whether the memory device or the write-back buffer has the data requested by a read instruction issued to the memory system. The data read from the write-back buffer is then written into the memory device and a modified version of the requested data is written to the write-back buffer in anticipation of subsequent transfer to the memory device.

18 Claims, 10 Drawing Sheets

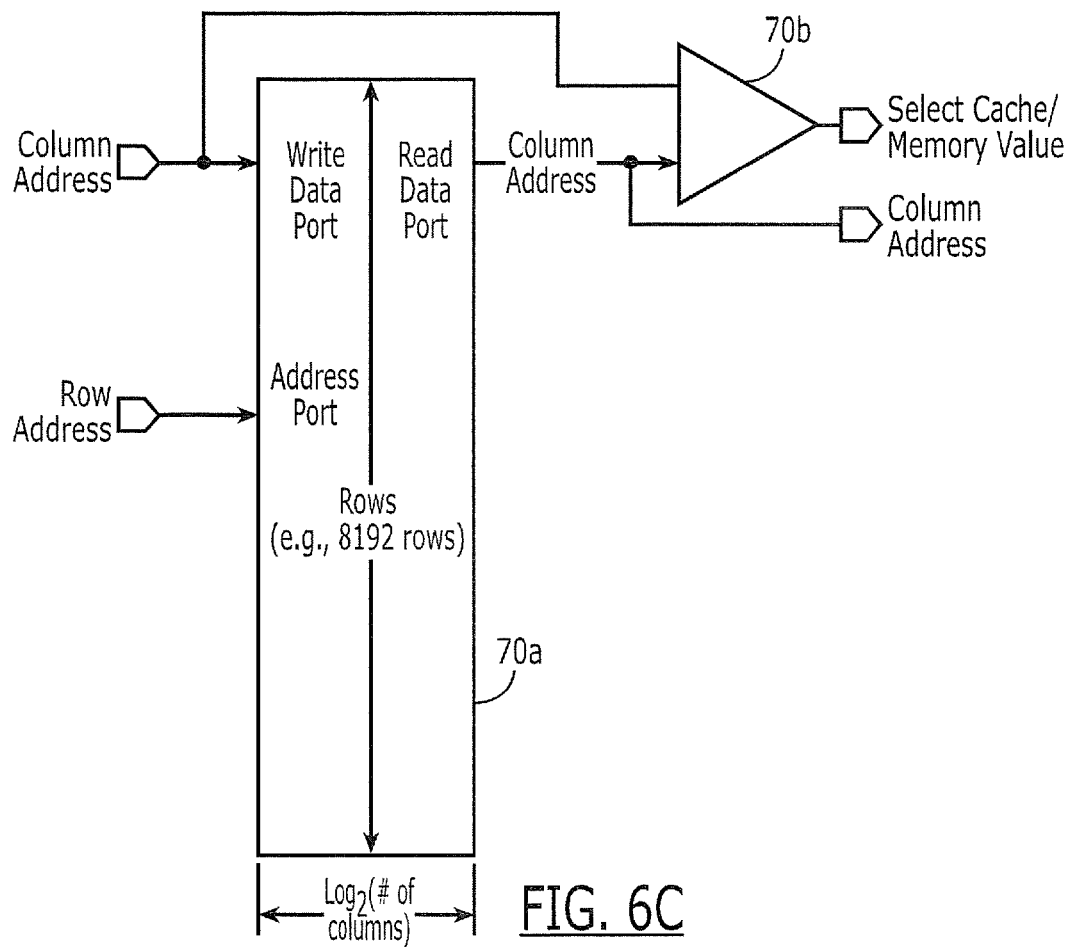

INTEGRATED CIRCUIT MEMORY SYSTEMS HAVING WRITE-BACK BUFFERS THEREIN THAT SUPPORT READ-WRITE-MODIFY (RWM) OPERATIONS WITHIN HIGH CAPACITY MEMORY DEVICES

REFERENCE TO PRIORITY APPLICATION

This application is a continuation-in-part of U.S. application Ser. No. 10/929,875, filed Aug. 30, 2004, now abandoned the disclosure of which is hereby incorporated herein by reference.

FIELD OF THE INVENTION

The present invention relates to integrated circuit devices and methods of operating same and, more particularly, to integrated circuit memory systems and methods of operating integrated circuit memory systems.

BACKGROUND OF THE INVENTION

State-of-the-art packet processors perform many operations on incoming packets at line rates (e.g., 10 Gb/s or higher). These operations include but are not limited to address lookup, packet classification, buffering, statistics maintenance, quality-of-service (QoS) scheduling and header editing. One category of packet processors includes packet switches, such as IP routers, ATM switches and Ethernet switches. Packet switches perform statistics maintenance for many reasons, including billing, firewalling, intrusion detection, network tracing and management, load balancing and traffic engineering.

In a typical scenario, a packet switch may receive and classify an incoming packet to assess what operations are to be performed on the packet. Such operations may include determining whether the packet should be accepted or dropped, or whether it should receive expedited processing. These determinations frequently result in updates to a large number of statistics, which may be represented as "counters". In particular, it is conceivable that ten thousand or more statistics may need to be maintained in switching applications using a routing table to maintain prefix use counts or in a router that counts packets belonging to each of a plurality of connections. Moreover, even when a relatively few number of statistics are updated for each received packet, the update rates can still be extremely high. For example, updating four statistics per packet received at a 10 Gb/s rate can correspond to an update rate of 100 M updates/s.

Unfortunately, because of layout area constraints, the updating of such a large number of statistics at line rates typically precludes the use of fast on-chip memory to maintain all statistics within a packet switch. To address this limitation, proposals have been made to include high capacity off-chip memory (e.g., DRAM) to maintain statistics, which are updated periodically using read-modify-write (RMW) operations that act under control of a counter management algorithm (CMA). One such proposal is disclosed in an article by D. Shah, S. Iyer, B. Prabhakar and N. McKeown entitled "Analysis of a Statistics Counter Architecture," which can be found on the internet at: http://tiny-tera.stanford.edu/~nickm/papers/hoti2001.pdf. Other proposals for performing statistics updates in packet switches are disclosed in U.S. Pat. No. 6,460,010 entitled "Method and Apparatus for Statistical Compilation," and in an article by S. Ramabhadran and G. Varghese entitled "Efficient Implementation of a Statistics Counter Architecture," which can be found on the internet at: http://www.cse-ucsd.edu/~varghese/papers/srirampaper.pdf.

FIG. 1 illustrates a timeline for a conventional read-modify-write (RMW) update cycle within a DDR2 SDRAM operating at 200 MHz, which may be coupled to a conventional packet switch. As demonstrated by this timeline, the RMW update cycle requires seventeen (17) clock cycles and twelve of these seventeen clock cycles are governed by internal DRAM characteristics, which are outside user control. These cycles include three clock cycles for bank access and transfer of read data from an addressed row to sense amplifiers ($t_{RCD}$) and three clock cycles for accessing an addressed segment of columns within the row ($t_{CL}$). The read data can be transferred over an interface bus, then modified (e.g., by adding the read data to a statistics update provided from on-chip memory within a packet switch) and then transferred back over the interface bus in five clock cycles, which are the only cycles that are a function of bus interface speed. Thereafter, three clock cycles may be required to write the modified data (e.g., updated statistic) into the sense amplifiers ($t_{WR}$) and three clock cycles may be required to transfer the write data from the sense amplifiers back to the addressed row within the SDRAM bank ($t_{RP}$).

However, this timing allows only one cycle for data modification, which is barely sufficient for data re-timing at the interface much less performing additional updating operations that may be necessary for particular applications. The performance of additional updating operations will typically require additional clock cycles and thereby reduce the maximum rate at which a memory bank can be updated under control of a packet switch. Finally, even if the bus interface speed characteristics are improved, the timing associated with the bus interface may have relatively little impact on the overall timing of an update cycle. This is because the update rates may still be limited by the timing associated with internal SDRAM characteristics that have generally remained constant with each new generation of device.

Additional networks, such as 10 Gb/s networks, may require state information to be updated at packet rates approaching 15 Mpps. Such state information may include connection state, metering, statistics for billing, performance monitoring and traffic engineering, scheduling and congestion management for traffic shaping and congestion control and aging for dynamic entry learning applications. Updating state information frequently implies that an old state is read from memory, an operation is performed on the old state read from memory and the updated state is returned to memory. Unfortunately, to support 10 Gb/s data rates, the options typically available to a designer include on-chip SRAM, which is relatively expensive and typically provides only limited capacity, on-chip DRAM, which is typically supported by only a few ASIC vendors and may be limited in size, and RLDRAM/NetDRAM, which is relatively expensive and not widely sourced. Moreover, conventional batch type updating operations may not be useful for stateful updating because a requested state value stored in memory must be retrieved for processing each current packet.

SUMMARY OF THE INVENTION

Integrated circuit memory systems according to embodiments of the present invention include write-back buffers that support read-write-modify (RWM) operations within a high capacity memory device (e.g., multi-bank SDRAM). Some of these embodiments include an integrated circuit memory device, a write-back buffer and a control circuit. The control circuit is configured to perform read-write-modify (RWM)

operations within the memory system. This RWM operation may include reading from the integrated circuit memory device and the write-back buffer to identify whether the memory device or the write-back buffer has the data requested by a read request issued to the memory system. The data read from the write-back buffer is then written into the memory device and a modified version of the requested data is written to the write-back buffer in anticipation of subsequent transfer to the memory device.

According to some of these embodiments, the write-back buffer and the control circuit may be integrated within a memory controller chip and the memory device may include at least one multi-bank dynamic random access memory (DRAM) chip, which is communicatively coupled to the controller chip. According to additional embodiments of the invention, the operations to read from the integrated circuit memory device and the write-back buffer includes reading first data from a row in the write-back buffer designated by a row address associated with the read request and reading second data from a row in the integrated circuit memory device designated by the row address. These operations to read first data may include reading a column address associated with the first data from the write-back buffer. The operations to read second data may include transferring a column address associated with the read request from the control circuit to the integrated circuit memory device.

The control circuit may be configured to compare the column address associated with the first data against the column address associated with the read request. A determination is then made that the data requested by the read request is the first data when the column address associated with the first data and the column address associated with the read request are equivalent. Alternatively, the data requested by the read request is the second data when the column address associated with the first data and the column address associated with the read request are not equivalent.

Operations to write the data read from the write-back buffer into the integrated circuit memory device includes writing the first data into the row in the integrated circuit memory device at a location specified by the column address associated with the first data and the row address associated with the read request. According to further aspects of these operations, a word line associated with the row in the integrated circuit memory device is controlled to remain active without interruption during the reading of the second data from the row in the integrated circuit memory device and the subsequent writing of the first data into the same row.

According to still further embodiments of the invention, the operations to write a modified version of the requested data includes transferring the requested data from the memory system to a processing device external the memory system and then transferring a modified version of the requested data from the processing device to the memory system. Each row in the write-back buffer may also map one-to-one to a corresponding row in the integrated circuit memory device. In addition, the reading of first data from a row in the write-back buffer may include reading a valid flag associated with the first data from the write-back buffer and checking the state of the valid flag. Furthermore, the control circuit may be configured to perform a write-back buffer initialization operation by reading a plurality of entries from a plurality of rows in the integrated circuit memory device and then at least partially filling the write-back buffer by writing the plurality of entries read from the integrated circuit memory device into the write-back buffer along with corresponding column addresses associated with the plurality of entries.

According to still further embodiments of the present invention, an integrated circuit memory system includes an integrated circuit memory device, a write-back buffer and a control circuit. The control circuit is configured to perform a sequence of read-write-modify (RWM) operations within the memory system. These RWM operations include reading first data from the integrated circuit memory device, then writing second data into the integrated circuit memory device and then modifying the first data read from the integrated circuit device. Thereafter, during a subsequent operation, third data is read from the integrated circuit memory device. The modified first data is then written into the integrated circuit memory device and the third data is modified. The operations to read first data and write second data includes reading first data from a first row in the integrated circuit memory device and then writing second data to the first row in the integrated circuit memory device. The operations to read the first data from the first row and write the second data to the first row may be performed without interrupting an active state of a word line associated with the first row. The operation to write the modified first data may also include writing the modified first data into the first row in the integrated circuit memory device.

BRIEF DESCRIPTION OF THE DRAWINGS

FIG. 6C is a block diagram of a column address memory and column address comparator that may be used in the cache controller of FIG. 6B.

DESCRIPTION OF PREFERRED EMBODIMENTS

Figure 1:
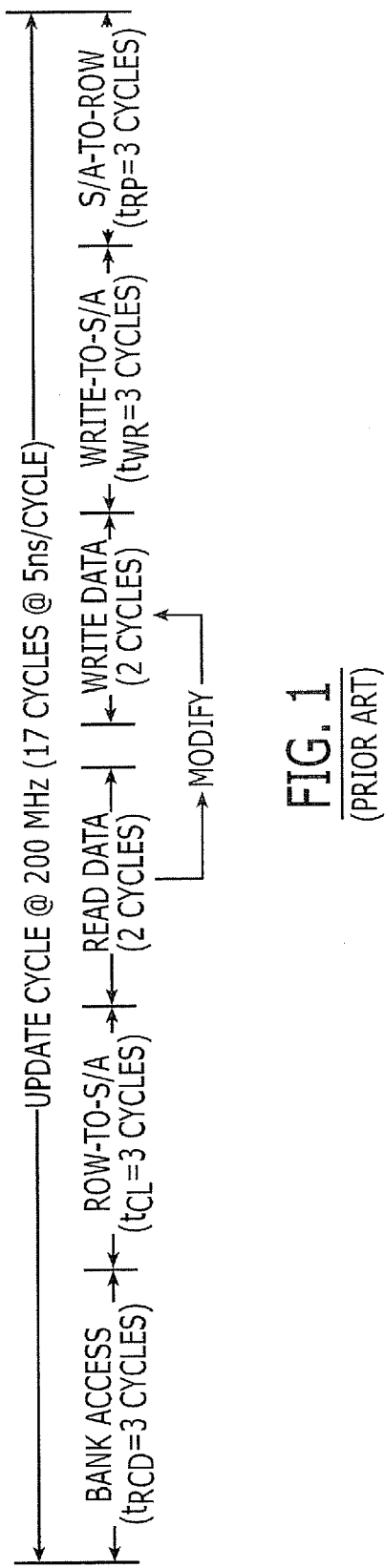
FIG. 1 illustrates the timing of conventional operations to update packet switch statistics in an external memory device.

The present invention will now be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals.

Figure 4:
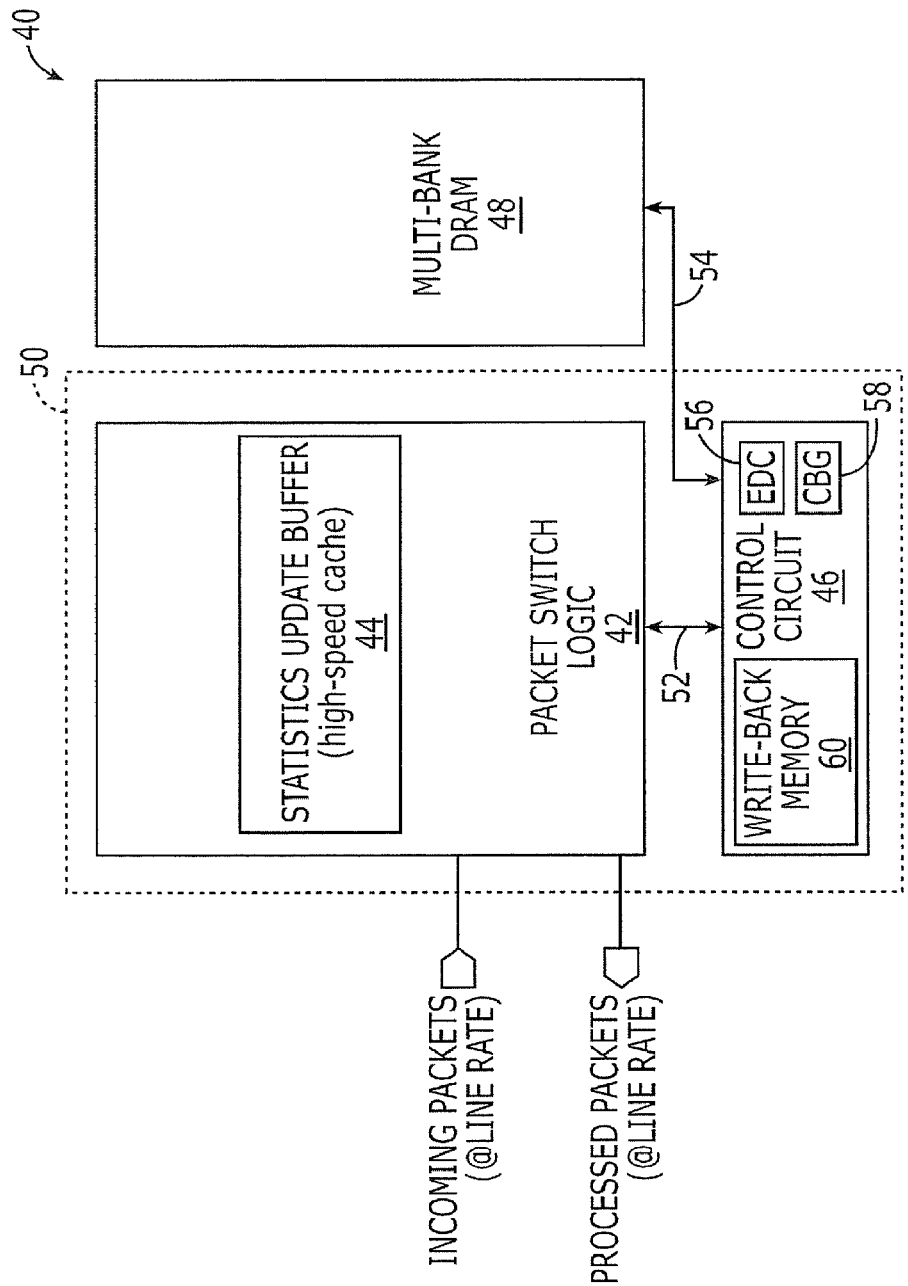
FIG. 4 is a block diagram of a packet processing system according to multiple embodiments of the present invention.

Referring now to FIG. 4, a packet processing system 40 according to embodiments of the present invention includes a packet switch 50 and a high capacity memory 48 located external to the packet switch 50. This high capacity memory 48, which is illustrated as a multi-bank DRAM memory device, is electrically coupled to a control circuit 46 within the packet switch 50. This electrical coupling may be provided by a bidirectional control/data bus 54. The packet switch 50 also includes packet switch logic 42. This packet switch logic 42 is illustrated as containing statistics update buffer 44, which can operate as a high speed addend cache memory. This update buffer 44 may be written to at a rate equivalent to the rate at which packets are received by the packet switch 50. In some embodiments of the present invention, the packet switch logic 42 and the control circuit 46 may reside on a single integrated circuit chip or on separate integrated circuit chips. The packet switch logic 42 is electrically coupled to the control circuit 46 by a bidirectional packet switch bus 52.

Figure 2:
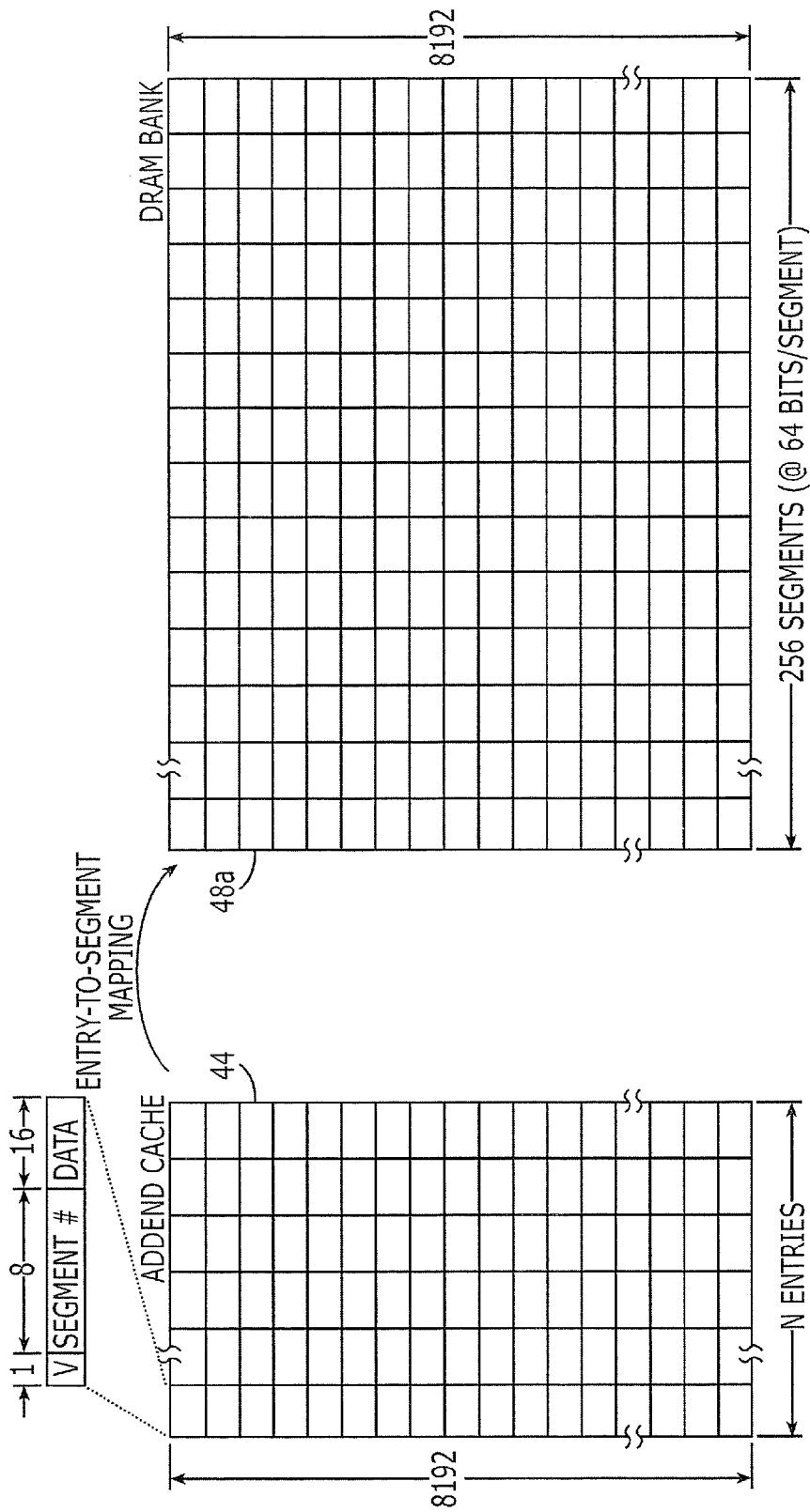
FIG. 2 is a block diagram that illustrates a mapping between entries in a statistics update buffer (e.g., addend cache) within a packet switch and segments of an external memory device, according to embodiments of the present invention.

As illustrated by FIG. 2, the statistics update buffer 44 is shown as having 8K rows, with each row containing N entries (e.g., N≧2). The value of N may be based on the timing and capacity characteristics of the high capacity memory 48, bus speed and desired update rate. Each of the N entries is illustrated as spanning 25 columns of memory cells (e.g., SRAM cells) within the update buffer 44. In particular, each entry is illustrated as being formatted into a flag field (1 column wide), a column field (8 columns wide) and a data field (16 columns wide). As described more fully hereinbelow with respect to FIGS. 3A-3B and 5, the data field may contain an addend to be added to a corresponding statistic within the high capacity memory 48. Operations besides addition may also be performed. These additional operations include, but are not limited to, increment, decrement and subtract. In some cases, the performance of an increment or decrement operation on a statistic contained within a segment of the high capacity memory 48 may not require a corresponding data field within the update buffer 44. Instead, this increment (or decrement) of a particular statistic may accompany an update of another related statistic (e.g., packet counter and packet byte counter) with an addend read from the update buffer 44. The flag field may contain a single valid bit that specifies whether the data in the data field is valid or not. Data may be automatically rendered invalid when the data is read from the update buffer 44 and the flag bit is reset. It is not necessary that all entries in a row be valid before a plurality of entries can be read from the update buffer 44 during operations to update the high capacity memory 48. Moreover, alternative embodiments may use a small count value (e.g., 1-bit (for N=2), 2-bit (for N=4), etc.) instead of flag bits to identify when a row within update buffer 44 contains all valid entries. In this case, a flag may be set to identify that a row within the update buffer 44 is ready for reading by the control circuit 46.

The column field of each entry includes a segment identifier. This segment identifier is a number that maps to a corresponding segment of columns within a bank 48a of the high capacity memory 48. This bank 48a is shown as having 8K rows, with each row containing 256 segments ($N_s=256=2^8$) at 64 bits/segment. Accordingly, the bank 48a is illustrated as supporting as many as 2M 64-bit statistics (i.e., 2M=256× 8K), with each row in the update buffer 44 mapping to a corresponding row in the bank 48a. In the event a 256 Mb GDDR3 DRAM is used as the high capacity memory 48, the number of rows in the update buffer 44 may equal 4K.

Figure 5:
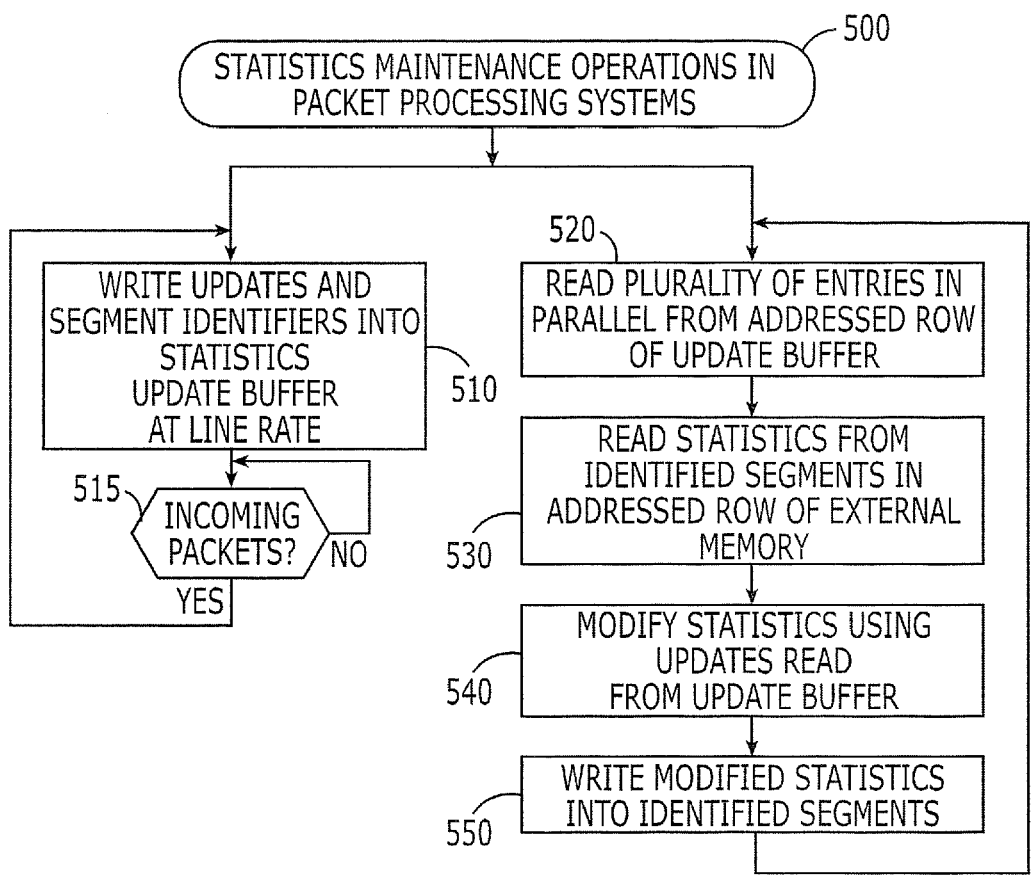
FIG. 5 illustrates operations performed by the packet processing system of FIG. 4.

The packet processing system 40 is configured to perform the statistics maintenance operations 500 illustrated by FIG. 5, which continue as a repeating cycle of statistics updates that may be performed as background operations within the packet processing system 40. These maintenance operations 500 include writing statistical updates (e.g., addends) and segment identifiers into entries in the statistics update buffer 44 at the line rate, Block 510. These segment identifiers specify segments in a corresponding row within the high capacity memory 48 that are to be updated with the transferred updates (e.g., statistics addends). As illustrated by Block 515, these operations to write the update buffer 44 are performed continuously while packets are being received by the packet switch 50.

As illustrated on the right side of FIG. 5, the N entries from an addressed row in the update buffer 44 may be read in parallel, Block 520, and, if valid, used to modify corresponding statistics within the high capacity memory 48. For purposes of illustration herein, all of the N entries read from the update buffer 44 will be treated as valid entries. These read operations may be performed in parallel with the operations illustrated on the left side of FIG. 5. Thus, in some cases, to prevent conflict between the high speed timing associated with writing entries into the update buffer 44 at line rates and reading a full row of entries from the update buffer 44, a duplicate update buffer (not shown) may be used to hold those new entries that arrive at the update buffer 44 when a read operation is being performed on the update buffer. The control circuit 46 may also include logic (e.g., pointers) that at least temporarily enables the duplicate update buffer once a new entry has been written to a row therein. The segment identifiers within the valid entries are used to identify a plurality of segments from an equivalent row in the high capacity memory 48. This row in the high capacity memory 48 can correspond to the row in the update buffer 44 from which the N entries were read. The corresponding N statistics at the N identified segments are then read from the high capacity memory 48, Block 530. These N statistics are then modified by the N statistics updates that were read from the N entries in the update buffer 44, Block 540. The modified statistics are then written back in parallel to their corresponding segments within the equivalent row in the high capacity memory 48, Block 550.

Figure 3A:
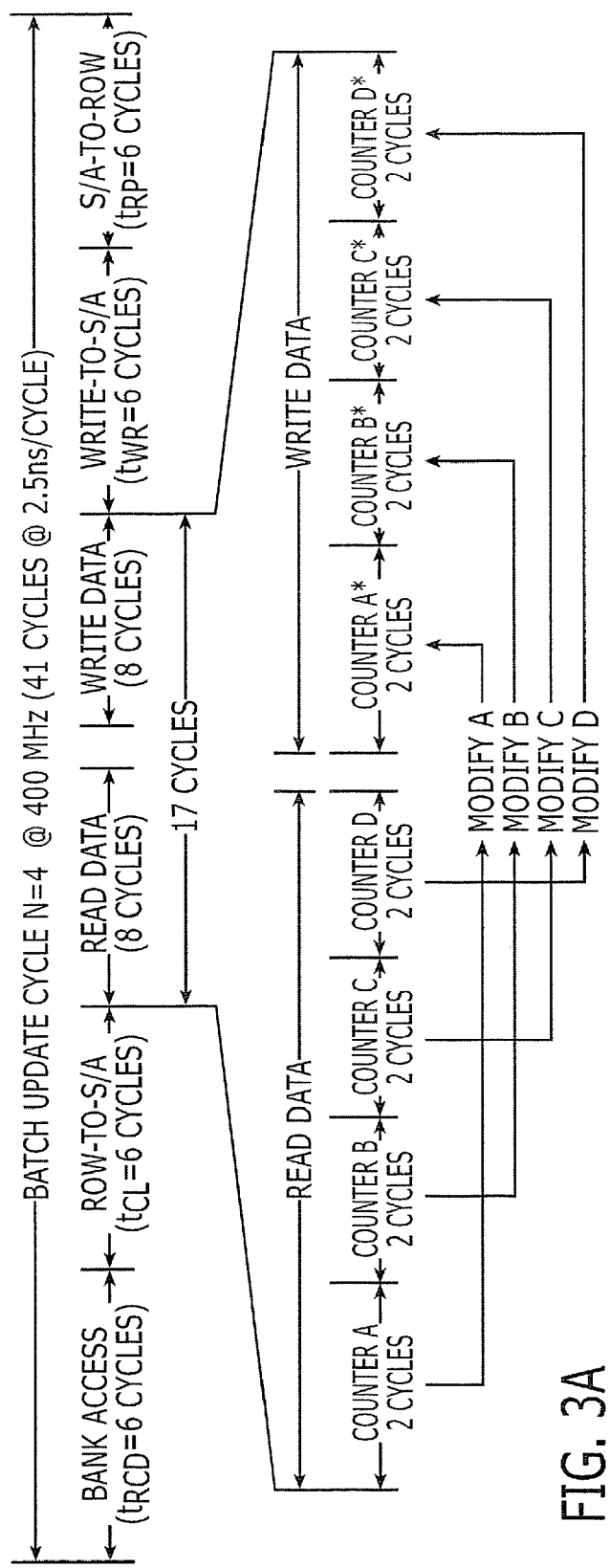
FIG. 3A illustrates the timing of operations to update packet switch statistics in an external memory device, according to embodiments of the present invention.

FIG. 3A illustrates a timeline for one cycle of the batch update operations of FIG. 5, for the case where N=4 within the update buffer 44. This batch update cycle is shown as spanning 41 clock cycles at 2.5 ns/cycle. Six clock cycles are required for each of the bank access operation, the row-to-SIA operation, the write-to-S/A operation and the S/A-to-row operation. The timing of these clock cycles is dictated by internal DRAM timing characteristics. As will be understood by those skilled in the art, the sense amplifiers operate as a memory buffer during periodic DRAM refresh operations and the read-modify-write (RMW) operations described herein. These four operations correspond to the operations by the same name in FIG. 1. In addition, eight cycles are required to read four selected statistics from the sense amplifiers within the bank 48a. These four selected statistics correspond to statistics designated by the segment identifiers from the N entries read from the cache memory 44. Similarly, eight cycles are required to write four modified statistics back to the sense amplifiers within the bank 48a. The four statistics from the four identified segments within a row of the bank 48a are identified herein as: counter A, counter B, counter C and counter D. Each of these statistics may be modified by adding each statistic to the corresponding statistic update previously read from the N entries in the cache memory 44. The modified statistics are identified as: counter A*, counter B*, counter C* and counter D*. These modified statistics are then used to overwrite selected portions of the data being buffered by the sense amplifiers during the write-to-S/A operation.

Figure 3B:
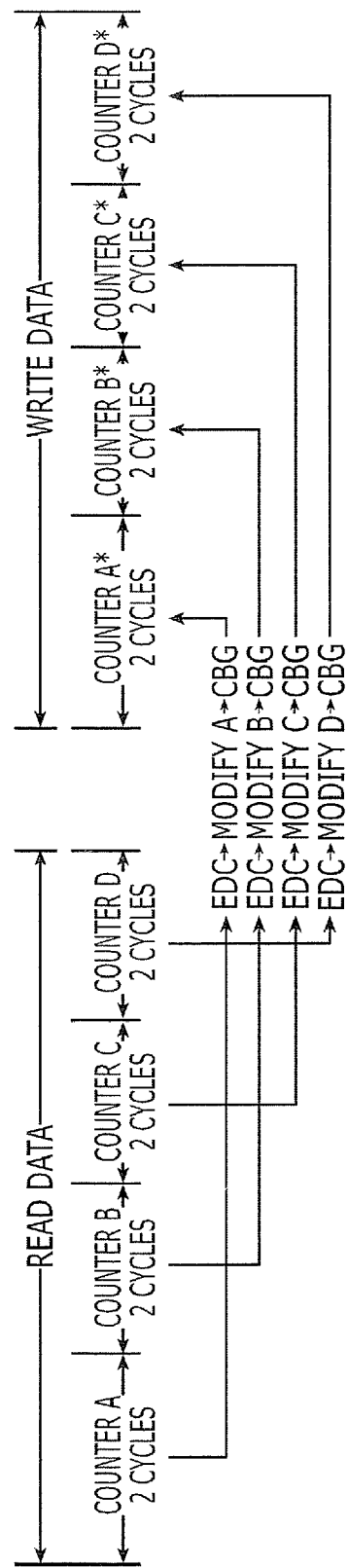
FIG. 3B illustrates the timing of operations to update packet switch statistics in an external memory device, according to embodiments of the present invention.

As illustrated by FIG. 3B, the segments within bank 48a may include statistics and corresponding check bits (CB). These check bits may be used to perform error detection and correction (EDC) operations on the corresponding statistics prior to the modification operations. In addition, once modified, new check bits may be generated using check bit generation (CBG) operations and then written back into the bank 48a. These error detection and correction and check bit generation operations may be performed by corresponding EDC and CBG circuitry 56 and 58 within the control circuit 46. If the timing of these additional "modify" operations is large, then a write-back buffer 60 may be used to temporarily hold modified statistics, as explained more fully hereinbelow.

Figure 3C:
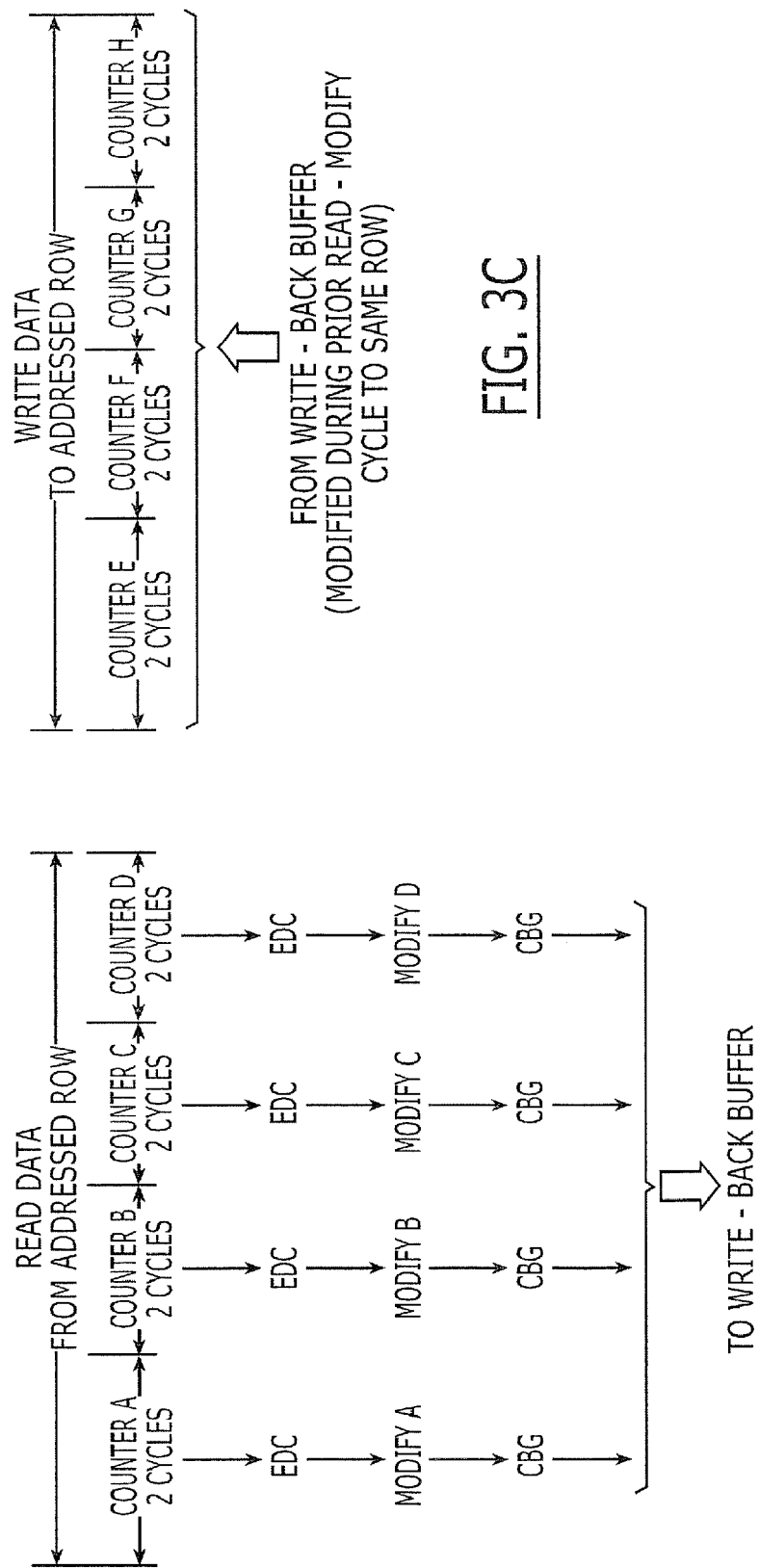
FIG. 3C illustrates the timing of operations to update packet switch statistics in an external memory device, according to embodiments of the present invention.

As illustrated by FIG. 3C, further embodiments of the present invention improve statistics updating efficiency by performing a "split transaction" operation within the bank 48a. These operations may be performed under control of the control circuit 46 illustrated by FIG. 4. In these embodiments, the write-back buffer 60 operates as a temporary buffer for statistics that have been updated in response to a read-modify (RM) operation. In particular, a read operation may be performed to read a first plurality of statistics (shown as counters A, B, C and D) from a first plurality of segments within an addressed row in the bank 48a. Each of these first plurality of statistics may be passed in sequence across an interface bus to the control circuit 46. Background operations may then be performed to check these first plurality of statistics for errors and correct them, if necessary, within the error detection and correction (EDC) circuitry 56. The checked statistics are then modified with updates (e.g., addends) previously read (along with segment identifiers) from N entries within the statistics update buffer 44. The modified statistics may then be passed to the check bit generation (CBG) circuitry 58 so that the modified statistics and corresponding check bits may be written into the write-back memory 60 (along with the corresponding segment identifiers read from the update buffer 44). In alternative embodiments, the modified statistics may be provided to the check bit generation circuitry 58 upon being transferred from the write-back memory 60 to the bank 48a.

As illustrated by the right side of FIG. 3C, after the first plurality of statistics have been passed across the interface bus, a plurality of previously modified statistics (and corresponding check bits and segment identifiers) are passed across the interface bus to a write port of the bank 48a. Thereafter, these modified statistics (and check bits), shown as counters E-H, are written into the identified segments in the addressed row in the bank 48a. This is the same row from which the first plurality of statistics were previously read from at the beginning of the update operation, which enables the corresponding word line for the addressed row to remain active during these concurrent read and write operations.

Accordingly, by having the modify operations performed as background operations, the latencies associated with the "modify" portions of read-modify-write (RMW) operations may be eliminated from statistics update operations.

Figure 6A:
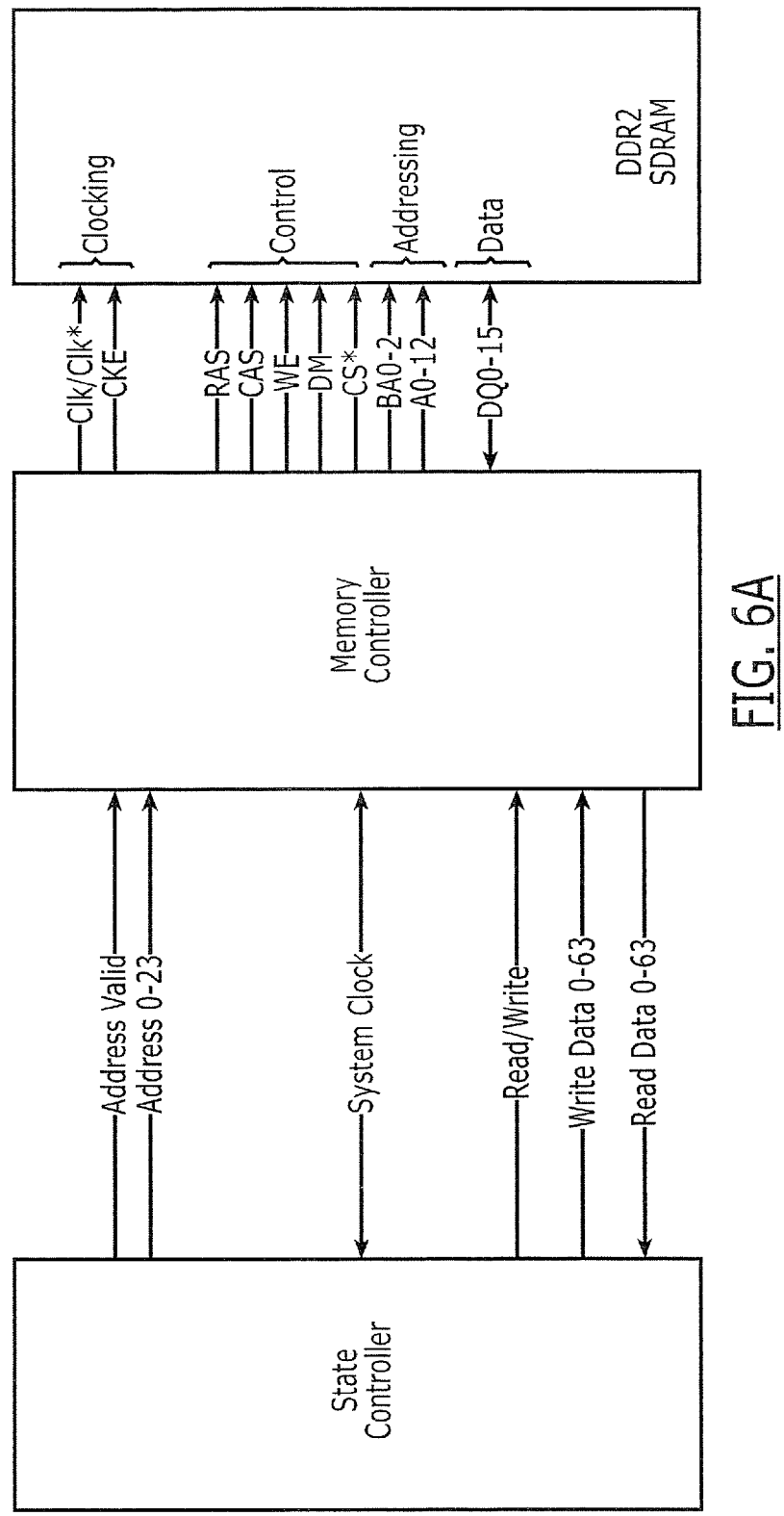
FIG. 6A is a block diagram of an integrated circuit system according to another embodiment of the present invention, including a state controller and a memory system, which includes a memory controller and high capacity memory device.
Figure 6B:
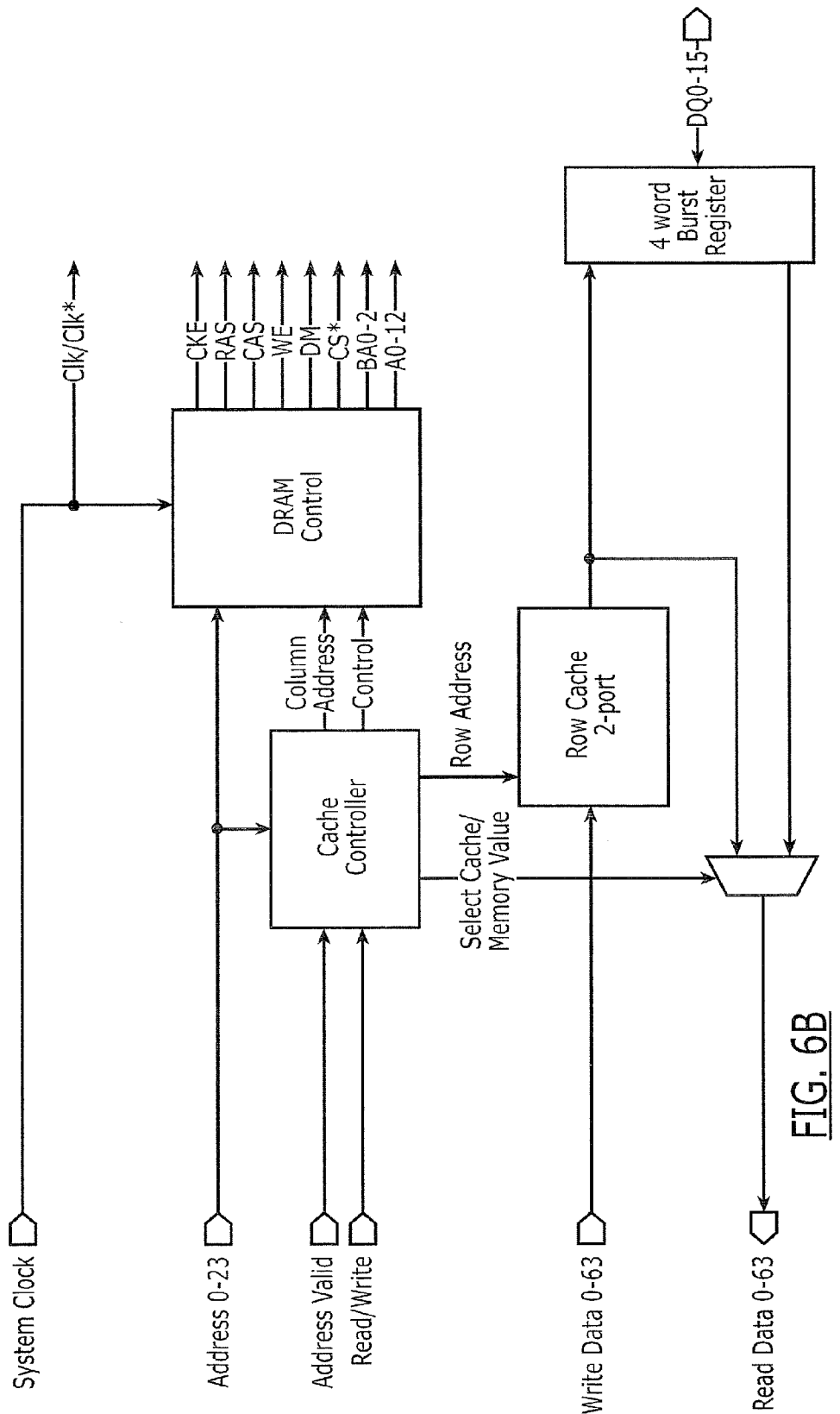
FIG. 6B is a block diagram of the memory controller of FIG. 6A, according to embodiments of the present invention.

An integrated circuit system according to further embodiments of the present invention is illustrated by FIGS. 6A-6C. In particular, FIG. 6A is a block diagram of a multi-chip integrated circuit system, which includes a state controller 602 and a memory system 600. The memory system 600 is illustrated as including a memory controller 604 and a high capacity memory device 606. The state controller 602, which may be a component of a host processing device (not shown), is electrically coupled to the memory controller 604 by a plurality of data and control signal lines. The illustrated data and control signal lines include an address bus (Address 0-23), a write data bus (Write Data 0-63) and a read data bus (Read Data 0-63). A signal line(s) (Address Valid) is also provided so that the validity of the data on the address bus can be determined by the memory controller 604. Another signal line(s) (Read/Write) may also be provided to signify whether the memory controller 604 is to undertake a read or write operation with respect to the high capacity memory device 606, in response to an instruction issued by the state controller 602. As illustrated, the state controller 602 and the memory system 600 may operate in-sync with a system clock (SYSTEM CLOCK).

According to some embodiments of the present invention, the memory controller 604 and the high capacity memory device 606 may be configured as separate integrated circuit chips within the memory system 600. According to these embodiments, the high capacity memory device 606 may be provided by one or more dynamic random access memory chips (e.g., DDR2 SDRAM) of conventional design, which receive a differential system clock (CLK/CLK*) from the memory controller 604. The memory controller 604 is also configured to provide conventional row address strobe (RAS), column address strobe (CAS), write enable (WE), data mask (DM), chip select (CS*), bank select (BA0-2) and address (A0-12) signals to the memory device 606. As will be understood by those skilled in the art, the 13-bit address signal lines (A0-12) may provide both row and column addresses at a rate of 13-bits per cycle, for example. A 16-bit bidirectional data bus DQO-15 is also provided between the memory controller 604 and the memory device 606.

FIG. 6B is a detailed block diagram of one embodiment of the memory controller 604 of FIG. 6A, which includes a cache controller 70, DRAM controller 74 and a row cache memory 72 (e.g., dual-port memory), connected as illustrated. A burst register 78 and multiplexer 76 are also provided. The cache controller 70 is configured to perform the operations described more fully hereinbelow and the DRAM controller 74 is configured to perform operations that support the cache controller 70 and also perform conventional DRAM control operations. The row cache memory 72 is configured to store write data (e.g., generated during a series of read-modify-write (RMW) operations) to be written into the memory device 606, in response to a write or read instruction issued from the state controller 602 to the memory controller 604. Instructions issued by the state controller 602 are also referred to herein as requests.

As illustrated by FIG. 6C, a column address cache memory 70a and a column address comparator 70b are also provided within the memory controller 604 and, in particular, within the cache controller 70. As described more fully hereinbelow, the column address cache memory 70a and the row cache memory 72 collectively operate as a write-back memory buffer, which stores column addresses and data to be written to the memory device 606 at the columns specified by the column address cache memory 70a. In the illustrated embodiments, the rows in the column address cache memory 70a and the row cache memory 72 map one-to-one to the rows in the memory device 606.

The column address comparator Mb generates a first signal (e.g., logic 1) when an applied column address is detected as being equivalent to a column address stored in a selected row of the column address cache memory 70a. The location of this selected row is determined from an applied row address.

Alternatively, the comparator 70b generates a second signal (e.g., logic 0) when the two column addresses are not equivalent. The applied column and row addresses may be received concurrently with a read (or write) instruction and the first and second signals may be provided on a signal line designated as: Select Cache/Memory Value. As illustrated by FIG. 6B, the signal line Select Cache/Memory Value extends from the cache controller 70 to a control input of the multiplexer 76. In this manner, the first and second signals may be generated by the cache controller 70 to select whether the read data (Read Data 0-63) passed from the memory controller 604 to the state controller 602, in response to a read instruction, is derived from the row cache memory 72 (because it has more current data) or derived from the high capacity memory device 606.

The column address cache memory 70a of FIG. 6C is illustrated as having a capacity of 8192 rows and including a write data port, a read data port and an address port. The write data port and the address port are respectively configured to receive a column address (to be stored within the memory) and a row address. These addresses are provided on an address bus (Address 0-23) when write or read instructions are issued by the state controller 602. The width of the column address cache memory 70a is illustrated as being equal to $\log_2$(# of columns), where the number of columns refers to the number of multi-bit memory segments within the memory device 606. As described herein, each column/segment of the memory device 606 is treated as storing 64 bits of data, for example.

The memory system 600 according to embodiments of the present invention is configured to perform stateful update operations as a sequence of read-modify-write (RMW) operations having the timing illustrated by FIG. 1, but without any delay associated with data modification. In particular, the memory system 600 is illustrated as including an integrated circuit memory device 606 and a memory controller 604 having a write-back buffer (70a and 72) and a control circuit (70 and 74) therein. The memory controller 604 may prepare for the performance of stateful update operations by initializing (i.e., populating) the write-back buffer (70a and 72). This initialization may include reading entries row-by-row from designated columns in the memory device 606 and then sequentially writing the entries and corresponding column addresses from the state controller 602 to the row cache 72 and column address cache 70a.

Following initialization, the memory controller 604 may perform a stateful update operation by reading selected data from the memory device 606 and concurrently reading data (e.g., column address and buffered write data) from the column address cache memory 70a and the row cache memory 72. The reading of a column address from the column address cache memory 70a is performed in order to identify whether the memory device 606 or row cache memory 72 has the most up-to-date "read" data requested by a read instruction associated with a corresponding stateful update operation. The most up-to-date read data is then passed through the multiplexer 76 to the read data bus (Read Data 0-63). This data is subsequently modified by the state controller 602.

The stateful update operations further include passing the data read from the row cache memory 72 through the burst register 78 to a corresponding column (i.e., segment) in the memory device 606. In particular, this previously buffered data is written into the memory device 606 at a location defined by the column address read from the column address cache memory 70a. The data received from the memory controller 604 in response to the read request and then modified by the state controller 602 is also written back to a corresponding row in the row cache 72. This write back operation includes storing the corresponding column address associated with the modified data into the column address cache memory 70a.

Based on the above-described configuration of the memory controller 604, the issuance of a read request/instruction from the state controller 602 to the memory controller 604 concurrently with the transfer of row and column addresses will result in an operation to read "first" data from a selected row in the row cache memory 72 (designated by the row address) concurrently with an operation to read "second" data from a selected row and column in the high capacity memory device 606. This reading of first data from the selected row in the row cache memory 72 may also include reading a valid flag from the selected row to determine whether the first data is valid data or not.

Thus, if the row address designates row 4029 and the column address designates column/segment 129, for example, then the buffered first data residing at row 4029 of the row cache memory 72 will be output from the read port of the row cache memory 72 and passed to the burst register 78 and a first input of the multiplexer 76. Concurrently with these operations, second data residing at row 4029 and column/segment 129 in the memory device 606 will be read from the memory device 606 and passed across the data bus (DQ0-15) to a second input of the multiplexer 76. In addition, the specified column address of 129 will be provided to a first input of the column address comparator 70b and another column address stored at a designated row in the column address cache memory 70a will be provided to a second input of the column address comparator 70b. The selection of the column address within the column address cache memory 70a is made in response to the row address of 4029 provided by the state controller 602 to the memory controller 604. If the column address comparator 70b detects an equivalency between the two column addresses, then the first data residing at row 4029 of the row cache memory 72 will be passed through the multiplexer 76 to the state controller 602.

Alternatively, if the column address comparator 70b detects an inequality between the two column addresses, then the second data read from row 4029 and column 129 of the memory device 606 will be passed through the multiplexer 76 to the state controller 602. The first or second data passed to the state controller 602 will undergo a modify operation and then be returned with a corresponding column address to the row cache memory 72 and the column address memory 70a within the memory controller 604, upon issuance of a corresponding write instruction by the state controller 602. Thus, for the example described herein, the modified data and the column address of 129 will be provided to row 4029 of the row cache memory 72 and the column address cache memory 70a, respectively, during an operation to write the modified data to the memory controller 604. This modified data will ultimately be read from the row cache memory 72 and then written to row 4029 and column 129 of the memory device 606 the next time an instruction to read data from row 4029 of the memory device 606 is transferred from the state controller 602 to the memory controller 604 to commence a stateful update operation as a read-modify-write operation.

In addition to these operations, the first data residing at row 4029 of the row cache memory 72, which was previously passed to the burst register 78, will be written into the memory device 606 at: (i) a row defined by the row address received concurrently with the original read instruction (i.e., row 4029) and; (ii) a column/segment defined by the column address read from the column address cache memory 70a and provided to the second input of the column address comparator 70b. In particular, the data written into the memory device 606 in response to a read instruction immediately follows the original reading of the second data from row 4029 and column 129 of the memory device 606, which means the read-modify-write operations achieved by the circuits of FIGS. 6A-6C achieve the timing illustrated by FIG. 1. Preferably, the reading of second data from row 4029 and column 129 of the memory device 606 and the subsequent writing of data read from the row cache memory 72 into a selected column at row 4029 of the memory device 606 is performed while a selected word line associated with row 4029 remains active (e.g., at a logic 1 level) without interruption. In this manner, a read-modify-write (RMW) operation can be performed without incurring any additional delay associated with operations to modify the data read during the read portion of the RMW operation. These same operations may also be utilized by the state controller 602 to perform a write operation that is independent of a stateful update operation.

In these situations, a read-modify-write operation may be performed that ignores the read data received by the state controller 602 and substitutes new write data for the "modified" read data to be written back to the row cache memory 72.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit memory system, comprising:
   an integrated circuit memory device;
   a write-back buffer; and
   a control circuit configured to perform a read-write-modify (RWM) operation within the memory system by:
      reading from said integrated circuit memory device and said write-back buffer to identify which one has data requested by a read request issued to the memory system;
      writing data read from said write-back buffer into said integrated circuit memory device: and
      writing a modified version of the requested data to said write-back buffer.

2. The memory system of claim 1, wherein said write-back buffer and said control circuit are integrated within a memory controller chip.

3. The memory system of claim 2, wherein said integrated circuit memory device comprises at least one dynamic random access memory (DRAM) chip.

4. The memory system of claim 3, wherein said integrated circuit memory device and the memory controller chip are communicatively coupled together by a data bus.

5. The memory system of claim 1, wherein reading from said integrated circuit memory device and said write-back buffer includes:
   reading first data from a row in said write-back buffer designated by a row address associated with the read request; and
   reading second data from a row in said integrated circuit memory device designated by the row address.

6. The memory system of claim 5, wherein reading first data includes reading a column address associated with the first data from said write-back buffer; and wherein reading second data includes transferring a column address associated with the read request from said control circuit to said integrated circuit memory device.

7. The memory system of claim 6, wherein said control circuit is further configured to compare the column address associated with the first data against the column address associated with the read request.

8. The memory system of claim 7, wherein the data requested by the read request is the first data when the column address associated with the first data and the column address associated with the read request are equivalent.

9. The memory system of claim 7, wherein the data requested by the read request is the second data when the column address associated with the first data and the column address associated with the read request are not equivalent.

10. The memory system of claim 6, wherein writing data read from said write-back buffer into said integrated circuit memory device comprises writing the first data into the row in said integrated circuit memory device at a location specified by the column address associated with the first data.

11. The memory system of claim 10, wherein a word line associated with the row in said integrated circuit memory device remains active without interruption during reading second data from the row in said integrated circuit memory device and writing the first data into the row said integrated circuit memory device.

12. The memory system of claim 1, wherein writing a modified version of the requested data includes:
   transferring the requested data from the memory system to a processing device external the memory system; and
   transferring a modified version of the requested data from the processing device to the memory system.

13. The memory system of claim 1, wherein each row in said write-back buffer maps one-to-one to a corresponding row in said integrated circuit memory device.

14. The memory system of claim 5, wherein reading first data from a row in said write-back buffer includes reading a valid flag associated with the first data from said write-back buffer.

15. The memory system of claim 1, wherein said control circuit is further configured to perform a write-back buffer initialization operation by:
   reading a plurality of entries from a plurality of rows in said integrated circuit memory device; and
   writing the plurality of entries read from said integrated circuit memory device into said write-back buffer.

16. An integrated circuit memory system, comprising:
   an integrated circuit memory device;
   a write-back buffer; and
   a control circuit configured to perform a sequence of read-write-modify (RWM) operations within the memory system by:
      reading first data from said integrated circuit memory device, then writing second data into said integrated circuit memory device and then modifying the first data read from said integrated circuit device; and
      reading third data from said integrated circuit memory device, then writing the modified first data into said integrated circuit memory device and then modifying the third data read from said integrated circuit device.

17. The memory system of claim 16, wherein reading first data and writing second data comprises reading first data from a first row in said integrated circuit memory device and then writing second data to the first row in said integrated circuit memory device.

18. The memory system of claim 17, wherein writing the modified first data comprising writing the modified first data into the first row in said integrated circuit memory device.

* * * * *